US012756876B1

(12) United States Patent
DiVerdi et al.

(10) Patent No.: US 12,756,876 B1
(45) Date of Patent: Oct. 6, 2026

(54) VIDEO COMPOSITION RETARGETING

(71) Applicant: Adobe Inc., San Jose, CA (US)

(72) Inventors: Stephen Joseph DiVerdi, Berkeley, CA (US); Mackenzie Marie Leake, Palo Alto, CA (US); Joshua Kong Yang, Acton, MA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 19/182,335

(22) Filed: Apr. 17, 2025

(51) Int. Cl.

| | |
|---|---|
| ***H04N 21/234*** | (2011.01) |
| ***G06F 40/284*** | (2020.01) |
| ***G06V 10/25*** | (2022.01) |
| ***G06V 40/20*** | (2022.01) |
| ***G10L 15/26*** | (2006.01) |

(52) U.S. Cl.
CPC ..... *H04N 21/23424* (2013.01); *G06F 40/284* (2020.01); *G06V 10/25* (2022.01); *G06V 40/23* (2022.01); *G10L 15/26* (2013.01)

(58) Field of Classification Search
CPC ............ H04N 21/23424; G06F 40/284; G06V 10/25; G06V 40/23; G10L 15/26
See application file for complete search history.

(56) References Cited

U.S. PATENT DOCUMENTS 10,867,422 B2 * 12/2020 Zhang ..................... G06T 11/60

OTHER PUBLICATIONS

Apostolidis, K. et al., "A Fast Smart-Cropping Method and Dataset for Video Retargeting," 2021 IEEE International Conference on Image Processing (ICIP), Sep. 2021, pp. 2618-2622.
Badros, G.J. et al., "The Cassowary linear arithmetic constraint solving algorithm," ACM Trans. Comput.-Hum. Interact. 8, 4, Dec. 2001, pp. 267-306.
Dayama, N.R. et al., "GRIDS: Interactive Layout Design with Integer Programming," CHI '20, arXiv:2001.02921v1 [cs.HC], Jan. 9, 2020, pp. 1-13.
Feng, W. et al., "LayoutGPT: Compositional Visual Planning and Generation with Large Language Models," 37th Conference on Neural Information Processing Systems (NeurIPS 2023), Dec. 2023, pp. 18225-18250.
Jiang, Y. et al., "ORC Layout: Adaptive GUI Layout with OR-Constraints," arXiv:1912.07827v1 [cs.HC], Dec. 17, 2019, pp. 1-12.
Jin, J.-G. et al., "Object-Ratio-Preserving Video Retargeting Framework based on Segmentation and Inpainting," 2023 IEEE/CVF Winter Conference on Applications of Computer Vision Workshops (WACVW), Jan. 2023, pp. 497-503.

(Continued)

*Primary Examiner* — Anthony Bantamoi
(74) *Attorney, Agent, or Firm* — Nicholson De Vos Webster & Elliott LLP

(57) ABSTRACT

Embodiments are disclosed for video composition retargeting. The method may include identifying at least one asset and associated source lexical data based on a source video and identifying corresponding target lexical data based on a target video. At least one asset retargeting time associated with the at least one asset is determined using the source lexical data and the target lexical data. At least one asset retargeting position associated with the at least one asset is determined based on the at least one asset retargeting time and the target video. The at least one asset is added to the target video using the at least one asset retargeting time and the at least one asset retargeting position.

20 Claims, 11 Drawing Sheets

(56) References Cited

OTHER PUBLICATIONS

Le, T.N.H. et al., "Retargeting Video with an End-to-End Framework," arXiv:2311.04458v2 [cs.CV], Nov. 9, 2023, pp. 1-23.
Soe, T.H. et al., "A content-aware tool for converting videos to narrower aspect ratios," IMX '22: ACM International Conference on Interactive Media Experiences, Jun. 22, 2022, pp. 109-120.
Zhang, J. et al., "LayoutDiffusion: Improving Graphic Layout Generation by Discrete Diffusion Probabilistic Models," 2023 IEEE/CVF International Conference on Computer Vision (ICCV), Oct. 2023, pp. 7192-7202.
Zhang, S. et al., "Editing Motion Graphics Video via Motion Vectorization and Transformation," ACM Trans. Graph., vol. 42, No. 6, Article 229, Dec. 2023, pp. 229:1-229:13.
Zheng, X. et al., "Content-aware Generative Modeling of Graphic Design Layouts," ACM Trans. Graph., vol. 38, No. 4, Article 133, Jul. 2019, pp. 133:1-133:15.

* cited by examiner

VIDEO COMPOSITION RETARGETING

BACKGROUND

Digital video production typically involves capturing multiple takes of a scene or scenes and then combining those takes together via digital video editing. For example, for many scripted videos, a video creator often records an actor's performance multiple times to get the best recording. These different performances can capture different phrasings, pacing, gestures, and vocal and visual performance qualities. The digital video editing process then involves combining these multiple recordings together by combining the best versions of each recording, adding effects, etc.

SUMMARY

Introduced here are techniques/technologies that enable automatic video composition retargeting. Video composition retargeting involves transferring graphical overlays from one video to another, while maintaining temporal and spatial alignment with respect to the video content. Because different videos capture different performances, variations in timing, actor positions, etc., require that the timing and positioning of graphic overlays be modified when they are retargeted to the new video. Embodiments can adapt the timing of overlays to non-uniform changes in the performer's speed, while also being robust to differences in the precise speech and gestures performed. Embodiments can also adapt the spatial placement of overlays to avoid overlapping the performer as they move to different positions at different times throughout the video.

In some embodiments a large language model (LLM) is used for transcript-based temporal alignment, with gesture recognition for fine-tuning of the timing, and integer linear programming for performing spatial alignment. Embodiments also provide a video editing GUI, which allows for retargeting between similar videos (e.g., different takes of the same actor performing the same script), dissimilar videos (e.g., the same actor performing variations of the script), across different actors performing the same script, across different aspect ratios (e.g., landscape to portrait), and across different languages (e.g., a source video in one language and a target video in another language).

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
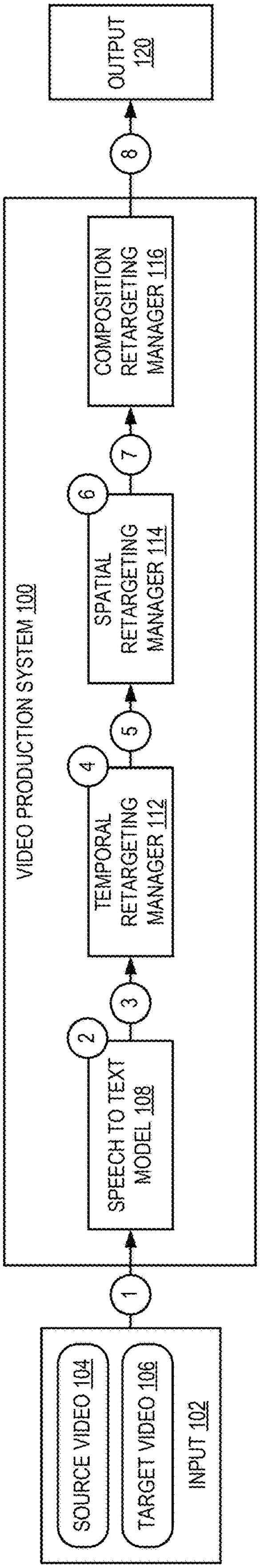
FIG. 1 illustrates a diagram of a process of video composition retargeting in accordance with one or more embodiments.

One or more embodiments of the present disclosure include a video production system that enables video composition retargeting. Video production often includes capturing multiple versions of a performance (e.g., takes) where each take may include minor differences in physical performance (e.g., gestures, position, posture, etc.), vocal performance (e.g., cadence, timing, phrasing, etc.), etc. Conventional video production systems enable a user to add additional effects, also referred to as assets, such as graphical overlays (e.g., images, animations, highlights, etc.). These assets are often images and text that illustrate or emphasize the performance, which therefore need to be aligned both temporally and spatially with the performance. For example, when an actor describes an object, an image of that object may appear relative to the actor's performance.

After carefully placing assets, the user exports this single, final video composition (i.e., video with these overlays). The linear process of creating a video composition makes it difficult to go back and make changes to the underlying video without having to redo the work of aligning graphical overlays with the performance. In practice, there are many reasons a video creator would want to substitute a different performance recording. For example, they may not be able to fully determine a performance's quality until seeing it in the full composition. They may discover that they should use a different performance or adjust performance cues and re-record the video with the actor. In other cases, they may want to produce multiple versions of the final video. These could be similar video compositions with different performers, possibly even in different languages for different target markets. They may also need to produce multiple video formats (i.e., vertical, horizontal, square) to target different social media channels. Performing any of these edits would require significant time and effort with current digital video editing tools, as each new version of the video would require manually adding and aligning the assets to each new version.

Existing video editing tools have been developed to assist with specific parts of the video editing process. Recently, tools have explored the use of natural language for video editing, such as using an LLM-powered agent to provide natural language directions for several common video editing steps, such as brainstorming and storyboarding as well as clip trimming. Other video editing tools have used LLMs to enable editing via natural language instructions, translating content into storyboards, or organizing clips for editing. Additionally, computational video editing has been applied to various genres of video, such as first-person narrative videos, 360-degree conversational videos, tutorials, and informational videos from websites. Prior work has focused on automating the assembly of scripted dialogue-based scenes using a probabilistic editing model to select among repeated takes and of narrated videos using audio-aligned transcripts and spoken annotations. Other prior work has focused on the selection of b-roll videos and other visual assets to display during spoken narration for informational videos, travel podcasts, live video meetings, and presentations. However, these prior techniques do not realign the user's chosen assets from one recording to another.

Some prior techniques have attempted to align video content via visual features and a transcript. For example, one prior technique can automatically temporally align multiple videos using a graph-based algorithm for detecting frames with similar visual features. Other tools have leveraged the alignment between the audio dialogue in a video and its text transcript, such as by using a statistical approach to align audio phonemes with a text transcript. Some computational video editing and review tools, build on top of this technology and use string edit distance to support alignment of transcripts with small deviations across performances or mismatches between the audio and script. However, these prior techniques do not determine correspondences between media content and remapping across different performances. In addition, while some prior techniques do support alignment in view of small deviations across performances, they do not perform well on videos with large deviations, such as when two sections of content have their word order swapped entirely, or semantically similar words and phrases are introduced.

Other attempts have been made to manage the spatial layout of visual content. These include various domain-specific approaches, such as techniques for optimizing GUI and web layouts. For video, layout guidance relies on pre-defined templates to guide capture or pre-defined layout templates to support the creation of a video from a document or desktop to mobile viewing of educational content.

Another area of prior work has sought to address the challenge of retargeting images and videos to different aspect ratios. A classical technique for images and videos is seam carving, which preserves important visual features while minimizing distortion by removing pixels in lower energy regions of the image or frame to achieve a target aspect ratio. Other work relies on content detection to intelligently reduce the width of the frame or eye gaze to select the different, key regions of the video to show on different displays. As such, these techniques do not move assets from one video to another, but instead refocus the video as needed based on changing aspect ratio, etc.

To address these and other deficiencies in conventional systems, the video production system of the present disclosure enables automatic video composition retargeting, the act of transferring graphical overlays from one video to another, while maintaining temporal and spatial alignment with respect to the video content. The video production system can adapt the timing of overlays to non-uniform changes in the performer's speed, while also being robust to differences in the precise speech and gestures performed. Embodiments can also adapt the spatial placement of overlays to avoid overlapping the performer as they move to different positions at different times throughout the video.

In some embodiments a large language model (LLM) is used for transcript-based temporal alignment, with gesture recognition for fine-tuning timing, and integer linear programming for spatial alignment. Embodiments also provide a video editing GUI, which allows for retargeting between similar videos (e.g., different takes of the same actor performing the same script), dissimilar videos (e.g., the same actor performing variations of the script), across different actors performing the same script, across different aspect ratios (e.g., landscape to portrait), and across different languages (e.g., a source video in one language and a target video in another language). The result is a video production system that can save video creators significant time and effort while enabling new workflows for video editing.

FIG. 1 illustrates a diagram of a process of video composition retargeting in accordance with one or more embodiments. As shown in FIG. 1, embodiments include a video production system 100. Video production system 100 may be implemented, for example, as a standalone service or within a larger application or suite of applications. For example, the video production system 100 may be implemented as part of a video editing application, image editing application, etc.

In the example of FIG. 1, at numeral 1, input digital videos 102 are received. As shown, the input digital videos 102 can include a source video 104 and a target video 106. The source video 104 can be a video composition. In this context, a "video composition" can include a document in any digital editing video tool, comprising a single video with multiple graphical elements (e.g., assets) placed on top, appearing at times and in positions that are "aligned" with the content of the video. For example, when a performer in a video says the word "lemon" in the phrase "lemon meringue pie," an illustrative image of such a pie briefly appears next to them.

Examples are discussed with respect to a single input video. However, embodiments may also be applied to a single timeline which may comprise multiple videos in a sequence. In such example, the source video may be a source timeline comprising a plurality of videos in one sequence and the target video may be a target timeline comprising multiple videos in a different sequence. For example, the target timeline may include the same plurality of videos as the source timeline but rearranged into a new sequence, or the target timeline may include a different plurality of videos in the same, or a different, sequence.

In some embodiments, the input videos 102 are speech-driven, with a single performer. These videos may include vlogs, livestreams, lectures, product or movie reviews, etc. Such video compositions are typically created in standard, commercial digital video editing tools. Source video 104 may represent one such completed video composition. If the creator wishes to use a different underlying video (e.g., another recording of the performer with clearer speech, fewer distractions, better timing, etc., or even a recording of a different performer) for the composition, such as target video 106, they must replace the original video with the new video, which causes all of the graphical elements' times and locations to become misaligned in the new target video because the target video's cadence and composition will be different. Video composition "retargeting" is the act of adjusting the times and locations of the graphical elements so they are well-aligned with the new video.

As shown in FIG. 1, the input videos 102 are received by speech-to-text module 108. The speech-to-text model 108 can include an automatic speech recognition (ASR) system that is trained to transcribe audio, such as the audio tracks associated with source video 104 and target video 106. In some embodiments, the ASR system is implemented as an encoder-decoder transformer model or other neural network model. However, various ASR systems may be used depending on implementation. Although depicted in FIG. 1 as being implemented as part of video production system 100, in some embodiments, the speech-to-text model 108 can be implemented as a separate system or service and, once transcripts have been obtained from the speech-to-text model 108, they may be provided to the video production system. At numeral 2, the speech-to-text model 108 processes the source video 104 and target video 106 and generates a source transcript and a target transcript.

A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

As discussed, the source video 104 is a video composition which can be characterized as a video and an associated number of events. The events can correspond to when and where graphical assets appear. These events need to be retargeted to the target video 106. Retargeting includes applying a sequence of events from one video onto another video, which requires updating the times and locations of those events to match the new video. Accordingly, embodiments include both temporal retargeting, where the times of events are adjusted, and spatial retargeting, where the location of events are adjusted.

At numeral 3, the source transcript and the target transcript are provided to temporal retargeting manager 112. At numeral 4, temporal retargeting manager 112 can identify the events associated with source video 104 along with corresponding context information in the source transcript and timestamp data. For example, in some embodiments, the temporal retargeting manager 112 can perform transcript alignment, which includes determining keywords and encompassing phrases/sentences (e.g., context) that correspond to assets appearing in the source video and then determining corresponding keywords and context in the target transcript. As discussed further below, the corresponding keywords and context does not have to be identical to that in the source transcript, instead semantically similar keywords and context can be identified in the target transcript as matching the keywords and context of the source transcript. For example, they may be semantically similar when the underlying meanings of the source and target text are similar. This way, the source text and target text can be matched, even if they are not phrased identically. This semantic similarity may also apply across languages. For example, if the source and target videos are in different languages, the semantic similarity of the text can still be determined (e.g., “eggs” in English is semantically similar to “huevos” in Spanish, despite them being in different languages).

This enables videos with significant rephrasing, ordering, etc. of content to be matched to similar content in the source video. This results in a set of retargeted times for the set of assets which is output by the temporal retargeting manager 112.

In some embodiments, the temporal retargeting manager 112 can refine the retargeted time the source video can also be analyzed to determine any motion depicted in the video that is associated with the events, such as speaker gestures or other motion. For example, a body tracking library may be used to track points of interest (POI) such as hand positions. The timing of gestures can then be used to refine the retargeted asset times, as discussed further below.

At numeral 5, the set of retargeted times for the set of assets can be provided to spatial retargeting manager 114. The retargeted times can be used to add the assets to the target video 106. However, because the underlying video content is different between the source and target videos, the assets may need to be repositioned. For example, if the position of the speaker has changed, then the asset positions may now interfere (e.g., overlap) with the speaker. At numeral 6, spatial retargeting manager 114 can implement heuristic-based rules to reposition assets. This may include identifying bounding boxes associated with the assets and associated with regions of interest in the target video. In some embodiments, integer programming is used to resolve position conflicts and determine a layout that satisfies the heuristic rules. The final satisfying layout yields the asset positions, which is the output of the spatial retargeting manager 114.

At numeral 7, the final asset positions and set of retargeting times can be provided to composition retargeting manager 116. Composition retargeting manager 116 is responsible for automatically updating target video 106 with the retargeted assets from source video 104 using the final asset positions and set of retargeting times. The resulting retargeted video can then be output 120 at numeral 8.

Figure 2:
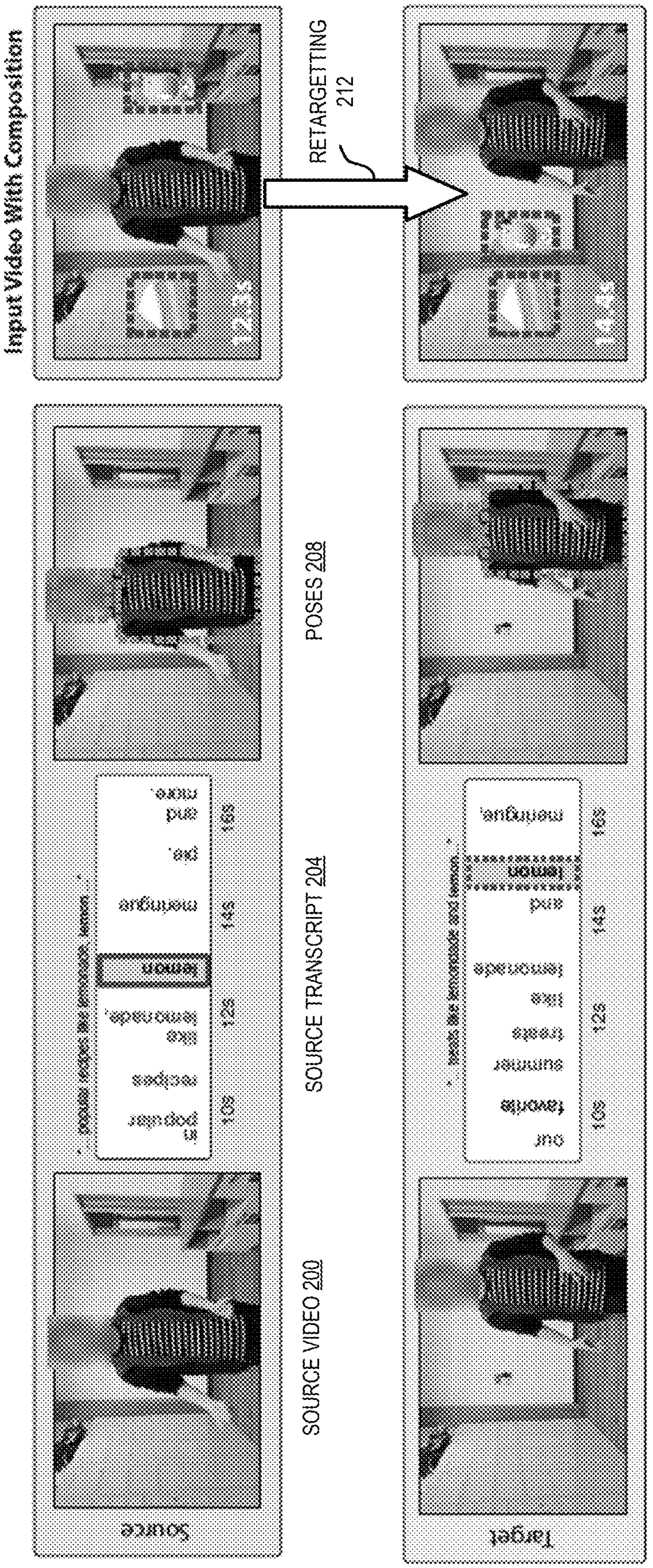
FIG. 2 illustrates an example of video composition retargeting in accordance with one or more embodiments.

FIG. 2 illustrates an example of video composition retargeting in accordance with one or more embodiments. As discussed, in video composition retargeting, graphical assets placed on a source video 200 are updated temporally and spatially to match a target video 202. As shown in FIG. 2, the source video 200 and target video 202 are two recordings of similar performances. A source transcript 204 is obtained corresponding to the source video 200 and a target transcript 206 is obtained corresponding to the target video 202. As discussed, the transcripts may be obtained using automated speech recognition techniques.

Using the transcripts, keywords and encompassing context can be identified which corresponds to assets added to the source video. The keyword and encompassing phrase (e.g., context) are also referred to as lexical data. In this example, the identified keyword is “lemon” and the context from the source and target are both similar (e.g., referring to lemonade and lemon), but not identical (e.g., one refers to “recipes” while the other to “treats”). In some embodiments, pose data may also be extracted from the videos to identify, which are characterized by their transcripts and body poses (used to identify face and torso bounding boxes) for use in spatial retargeting.

The user can add graphics to the source video at specific times to emphasize the content of the source video. The specific graphic and its position within the frame can both be selected by the user. During retargeting 212, the graphics are automatically retargeted to the target video. In particular, the timing of graphics is updated based on transcript alignment, and the location is updated based on optimization with respect to the body poses. For example, the graphics appear in the source video at 12.3 seconds, but are added to the second video at 14.4 seconds. This may be due to variations in the script and/or timing of the performance. Additionally, the speaker is repositioned on the right side of the frame in the target video, rather than the center of the frame as in the source video. As such, the graphic appearing on the right side of the speaker in the source video would overlap with the torso bounding box if the same position were used in the target video. Accordingly, during spatial retargeting the positions of the graphics are changed such that they do not overlap with any regions of interest (e.g., the speaker's bounding boxes) or other assets.

Figure 3:
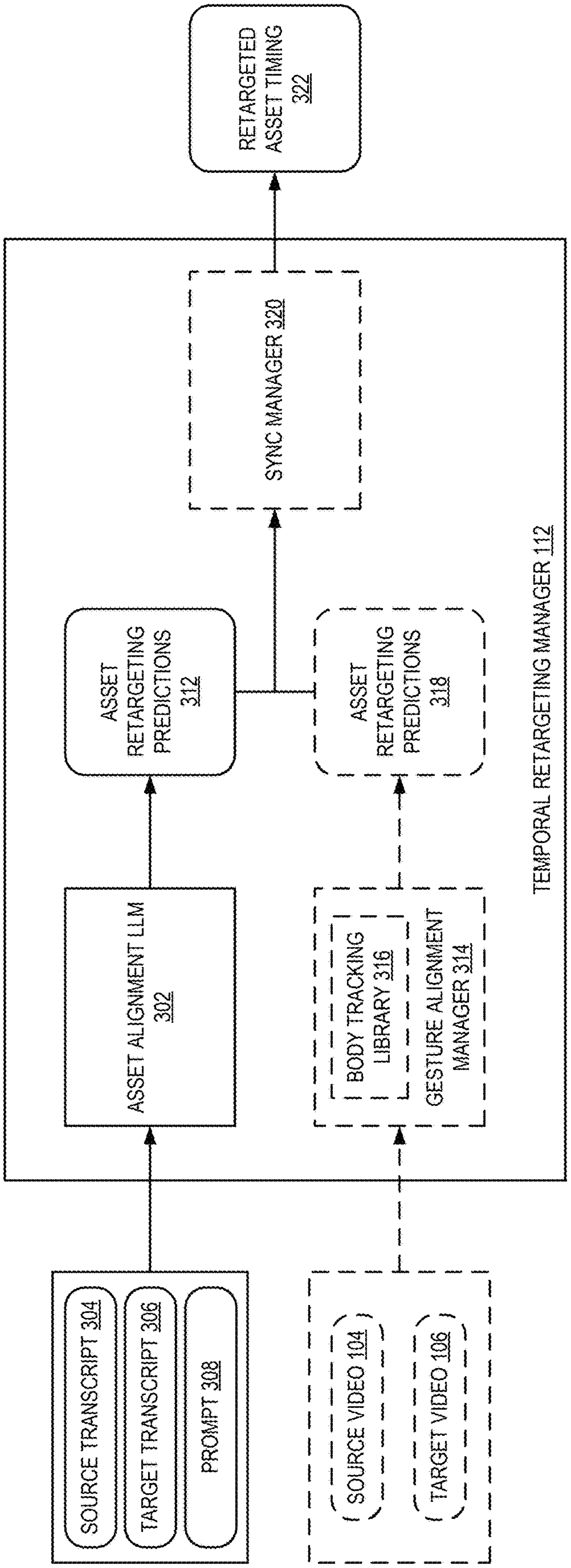
FIG. 3 illustrates a diagram of a temporal retargeting manager in accordance with one or more embodiments.

FIG. 3 illustrates a diagram of a temporal retargeting manager in accordance with one or more embodiments. As discussed, temporal retargeting manager is responsible for identifying the timing associated with assets in a source video and determining retargeted timings for those assets to appear at appropriate moments in a target video. A given source video composition includes a set of assets $A=\{a_1, \ldots, a_n\}$ that appear on the screen at times $t_i$. The temporal retargeting manager 112 finds the retargeted times $t_i'$ in the target video, e.g., when $a_i$ should appear in the target video. The temporal retargeting manager 112 can align times based on finding matching text in the source transcript 304 and target transcript 306.

A prior approach for transcript alignment is dynamic time warping, which must find alignments for every single word in the same order. However, different video takes may include different words or phrasing, which may result in different words being presented in different orders, but conveying the same or similar information. Accordingly, dynamic time warping and other edit distance based approaches can fail in this common scenario because they rely on having more similar words and syntax. Instead, embodiments use a large language model (LLM) 302 for alignment.

As discussed, a source transcript 304 and a target transcript 306 can be computed from the source and target videos. These transcripts may then be provided in full to asset alignment LLM as TRANSCRIPT_OLD and TRANSCRIPT_NEW respectively. For each asset $a_i$, the closest spoken word <$w_i$> is identified, which is offset from $a_i$ by $o_i=t_i-t_{w_i}$, and its encompassing phrase <$p_i$>. In some embodiments, the assets, closest spoken words, and encompassing phrases may be identified manually, using an LLM, or other techniques. With the source assets and their lexical context information identified, the asset alignment can be prompted to identify similar content for each asset in the target transcript. For example, the asset alignment LLM can be prompted with:

In TRANSCRIPT_OLD, I have an asset <i> that appears on the word <wi> in the phrase <pi> for all i sequentially. The assets di should be sorted by their appearance time against TRANSCRIPT_OLD. Then the asset alignment LLM 302 can be prompted to find matches by content similarity. For example, the prompt may be similar to:

Please tell me on which word in TRANSCRIPT_NEW should the asset <i> appear in the new video take, considering the context of where it came from, and the exact phrase it is located in for all i sequentially. Finally, the asset alignment LLM 302 can be prompted to post-process its output such that reliable, unambiguous string matching can be performed against the raw TRANSCRIPT_NEW to find the final correspondences:

Make sure the phrases are at least six words long. Make sure the phrases contain their respective found words so we can find them with string matching in the future. If two identical words appear at different places in the same phrase, please crop the first word's phrase from the end and crop the second word's phrase from the start so we can differentiate them later.

In some embodiments, the asset alignment LLM temperature is set relatively low, such as T=0.2, in order to achieve more consistent results. After prompting, the asset alignment LLM returns a set of new words $$w_i'$$

and phrases $$p_i'.$$

In some embodiments, string matching can be performed between each phrase $$p_i'$$

and TRANSCRIPT_NEW to find the unique aligned word $$w_i'$$

Repeating for and its timestamp. The final predicted time of the retargeted asset is $$t_i' = t'_{w_i'} + o_i.$$

Repeating for all i yields the new times of all assets in the target video, $$\{t_i'\}_{i=1}^{n},$$

which is the output of the temporal alignment step. These times indicate the most likely times in the target video when the corresponding assets should appear, as predicted by the asset alignment LLM. In some embodiments, the set of times can be converted into a continuous $\mathcal{T}_a$ similarity function by applying a gaussian at $$t_a'$$

over t:

$$\forall\, a \in A\mathcal{T}(a, t) = \mathcal{N}(t_a', \sigma^2)(t)$$

Alternatively, rather than using asset alignment LLM, some embodiments may implement an event voting technique to perform transcript alignment. In event voting, embodiments instead consider n-grams with n=8 words $w_{j-n, \ldots, j}$ that appear before each asset $a_i$ in TRANSCRIPT_OLD. Each $w_j$'s appearance time in relation to the asset is an offset $o_j=t_i-t_{w_j}$. To define similarity to TRANSCRIPT_NEW, embodiments consider all of the words W' in it and "splat" a gaussian (as a vote) if there is a match with one of the words wi, offsetting the splat by $o_j$. The closer j→0 the more important a word $w_j$ should be in determining the appearance of $a_i$, so small j is weighted greater than large j through $$\sigma_j = 1 + 2 \cdot \frac{(n-j)}{j}.$$

The more similar two transcripts are at a time t, the more votes are attained at said t and a greater-valued peak is attained. In some embodiments, votes that are greater than 20% of the video duration away are discarded. As a sum of gaussians over t:

$$\forall\, a \in A\mathcal{T}(a, t) = \sum_{i=1}^{|W'|} \sum_{j=1}^{n} \text{match}(a, i, j)(t)$$

$$\text{match}(a, i, j) = \begin{cases} \mathcal{N}(t'_a, \sigma^2) & \exists\, w_j : W'[i] = w_j \\ 0 & \text{otherwise} \end{cases}$$

As shown in FIG. 3, optionally, gesture alignment can be performed to fine-tune the timing of assets. As shown in FIG. 3, the temporal retargeting manager 112 may include a gesture alignment manager 314, which includes a body tracking library 316 to extract per-frame positions of the head and body of a person depicted in the source video 104 and target video 106. For gesture alignment, the hand positions are considered as the points of interest (POI) to describe the gestural information of the person being tracked as they are connected to the elbow, shoulder, and torso. The pixel-level hand positions—$\{p_t\}_{LH}$ and $\{p_t\}_{RH}$ as time series—are filtered with a discrete gaussian kernel (M=5, σ=1) before being processed into trajectory tokens. The hand trajectories can be resampled by constant distance traveled before interpreting each resulting line segment as a token in the following classes:

$$\text{token}(p_t, p_{t+1})$$

$$\begin{cases} S & POI \text{ is stopped} \\ O & POI \text{ moves straight forward} \\ L & POI \text{ moves } \Delta\theta \text{ left forward} \\ R & POI \text{ moves } \Delta\theta \text{ right forward} \\ X & POI \text{ is off screen} \end{cases} = \begin{cases} S & |p_t - p_{t+1}| < \epsilon \\ O & |p_t - p_{t+1}| > \epsilon, |\Delta\theta| < \delta \\ L & |p_t - p_{t+1}| > \epsilon, |\Delta\theta| > \delta \\ R & |p_t - p_{t+1}| > \epsilon, -|\Delta\theta| > \delta \\ X & p_t = \emptyset \wedge p_{t+1} = \emptyset \end{cases}$$

This enables a time series of tokens $\{x_t\}_{LH}$ and $\{x\}_{RH}$ to be obtained with the mapping token $(p_t, p_{t+1})$: $\mathbb{R}^2 \times \mathbb{R}^2 \mapsto \{S, O, L, R, X\}$. This allows the same event voting strategy discussed above with respect to transcript alignment to be used with the trajectory "word" tokens. For example, embodiments can consider n-grams with n=8 token words $x_{j-n, \ldots, j}$ that appear before each asset di in TRANSCRIPT_OLD. The time $t_{x_j}$ associated with token $x_j$ is interpolated during resampling between the two corresponding timestamps of the original hand positions. An offset can be similarly defined that describes the relation of each token to the asset's appearance time $o_j = t_i - t_{x_j}$. To define similarity to TRANSCRIPT_NEW, embodiments consider all of the tokens X' in it and "splat" a gaussian (as a vote) if there is a match with one of the $x_j$, offsetting the splat by $$o_j = 1 + 2 \cdot \frac{(n-j)}{n}$$

in a sum of gaussians over t. However, gesture data is subject to more noise and ambiguities than the transcript data, and global-level alignment ambiguities can be impossible to resolve by gesture data alone. Consider the case where the human waves with their left hand at the beginning of the video and at the end—the series of tokens is the same.

In such instances, embodiments assume gesture content is driven by the transcript. Given that the content of two videos is similar, matching gestures should occur within some envelope around time $\mathcal{T}$(a). So for computing gestural alignment of an asset a, embodiments can disregard any votes accumulated outside of a certain time τ away from $\mathcal{T}$ (a). Experimentally, it was found that τ=2000 milliseconds performs well. This implies that the implementation of gesture alignment is driven by the transcript alignment. The match function can therefore be adjusted accordingly:

$$\forall\, a \in A\mathcal{G}(a, t) = \sum_{i=1}^{|W'|} \sum_{j=1}^{n} \text{match}(a, i, j)(t)$$

$$\text{match}(a, i, j) = \begin{cases} \mathcal{N}(t_{x_j} + o_j, o_j^2) & \exists\, x_j : X'[i] = x_j, \left|t_{x_j} - \mathcal{T}(a)\right| < \tau \\ 0 & \text{otherwise} \end{cases}$$

In some embodiments, sync manager 320 is responsible for resolving differences between the retargeting predictions 312 produced by asset alignment LLM 302 and retargeting predictions 318 produced by gesture alignment manager 314. Disambiguating asset events triggered by a feature in the transcript versus a feature in the body tracking gestures is a non-trivial problem. Ideally, for the "optimal" retargeted time $s_a$ of an asset a, $\mathcal{T}$ and $\mathcal{G}$ would agree where $s_a = \text{argmax}_t \mathcal{G}$ (a, t) holds; however this is not always the case. For some ground truth $s_a$, scenarios can be observed with either A) $\mathcal{T}$ correct via high similarity and $\mathcal{G}$ wrong via low similarity and B) $\mathcal{T}$ wrong via low similarity and $\mathcal{G}$ correct via high similarity. Shifting a time t even 250 ms earlier or later can change scenario A) into scenario B) and vice versa.

This disambiguation issue arises on a local scale rather than a global scale, so if it is assumed that assets at the "local" scale appear in the same order in both the source and target videos, the search space is pinned down and ambiguities can be constrained. Nevertheless, assets may still appear out of order at the global or paragraph level. To resolve this, embodiments first consider local sets of assets individually, where the start and end times of all assets in such a set are within a temporal window (such as 1000 ms) of each other. These can be denoted as $S = \{a: |t_a - t_a| < 1000, a \in S\}$ and the S sets are ordered by the appearance timestamps $t_a$ for $a \in S$. Embodiments can find a non-decreasing set of timestamps $t_i$ for $a_i$ that maximizes similarity alignment across the assets. Total similarity can be computed as a product of asset similarity terms rather than a sum. Intuitively, poor matches have similarity →0 and multiplication by 0 makes the entire expression 0, immediately eliminating it from consideration. Another point to consider are the statistics of $\mathcal{T}$ and $\mathcal{G}$ which can still differ after normalization, depending on the underlying algorithms chosen. In some embodiments, a constant ρ can be chosen to balance their influence. As a result, the following can be solved for each S:

$$\underset{t_i}{\operatorname{argmax}} \prod_{i=1}^{|S|} \rho \mathcal{T}(a_i, t_i) + (1-\rho)\mathcal{G}(a_i, t_i)$$

$$\text{subject to } t_i's \text{ non-decreasing}$$

In some embodiments, the set of $s_i$ for the local set S can be approximated by only considering the local maxima of the cost term per asset, $p\mathcal{T}(a_i, t_i)+(1-\rho)\mathcal{G}(a_i, t_i)$ which, in turn, means only considering the local maxima of $\mathcal{T}(a_i, t_i)$ and $\mathcal{G}(a_i, t_i)$. Embodiments choose k=4 such peaks with the maximal 1 from $\mathcal{T}$ and maximal 3 from $\mathcal{G}$ as the candidates for $t_i \forall_i$. With |S| assets embodiments can search all possible non-decreasing combinations of $t_i$ (choosing 1 of k candidates per each i) which there are at most $k^{|s|}$ number of them. This is equivalent to finding the highest-cost path through a directed graph and can be solved with either dynamic programming or direct searching when k and |S| are small.

In some embodiments, asset compositions may also involve multiple assets that appear at the same time and multiple assets disappearing at the same time. The relative offsets of a word and trajectory token typically change between the source and target videos due to human cadence variations. Thus, it can be necessary to re-sync these assets. For a group $\overline{A}$ of assets a that appear within ρ=100 milliseconds in the source video, embodiments set $s_a$ $\forall a \in \overline{A}$ to the earliest retargeted time within the group, e.g., min $s_a$, in the target video. Similarly for a group $*\overline{A}$ of assets a that disappear within the same ρ milliseconds in the source video, embodiments set $*s_a \forall a \in *\overline{A}$ to the latest retargeted time within the group, e.g., max $*s_a$, in the target video. The choice of min for $s_a$ and max for $*s_a$ helps prevent clipping effects where the start moves forward and the end moves backwards. It is important to note that $\overline{A}$ is not necessarily the same set as $*\overline{A}$, and it is possible for them to be entirely disjoint.

Figure 4:
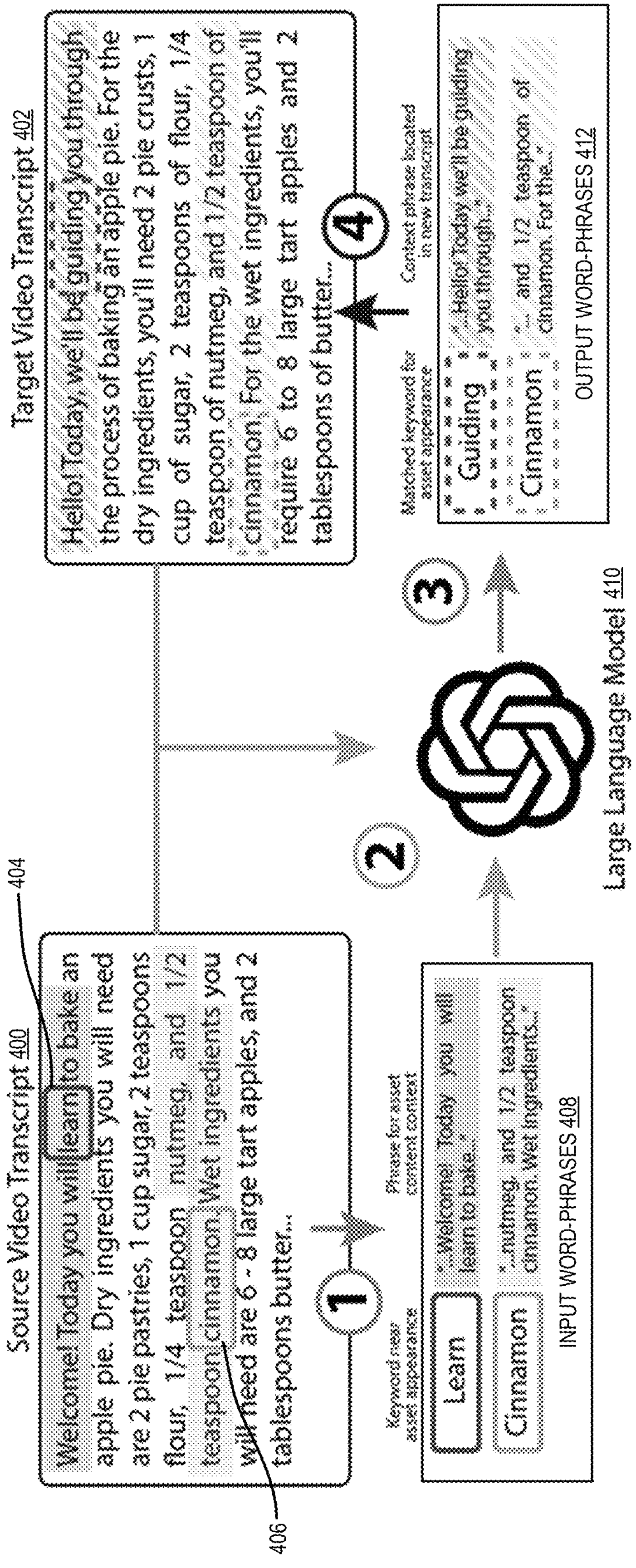
FIG. 4 illustrates an example of transcript alignment in accordance with one or more embodiments.

FIG. 4 illustrates an example of transcript alignment in accordance with one or more embodiments. As discussed, once the source transcript 400 and target transcript 402 have been obtained, temporal alignment using an LLM can occur in four stages. In the first stage, for each asset that appears in the video, the closest lexical word and the phrase location are identified. In the example of FIG. 4, assets appear at the words "learn" 404 and "cinnamon" 406. This results in input word-phrase pairs 408. The offset time between the word and asset appearance can also be computed using the transcript. In the second step, the source video transcript and target video transcript are provided to the LLM 410. The input word-phrase pairs are also provided to the LLM 410, sorted by order of appearance in the source video transcript. In the third step, the LLM 410 is prompted to find the corresponding words and their surrounding phrases in the target video's transcript, yielding output word-phrase pairs 412. In step four, the output word-phrase pairs 412 are used to perform string matching to find the matched lexical word in the target video transcript. In this example, the matched words are "guiding" for "learn" and "cinnamon" for "cinnamon". The matched word's timestamp is recombined with the offset to result in the predicted time an asset should appear in the new video (e.g., the target video).

Figure 5:
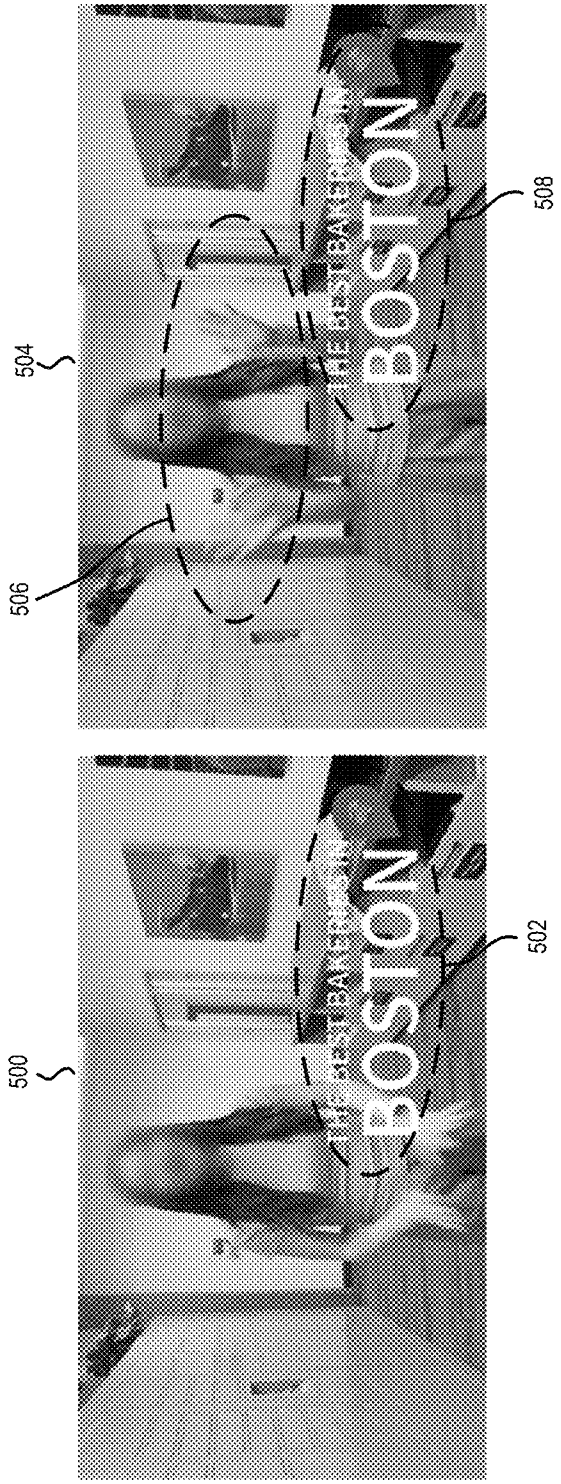
FIG. 5 illustrates an example of gesture fine-tuning in accordance with one or more embodiments.

FIG. 5 illustrates an example of gesture fine tuning in accordance with one or more embodiments. In the example of FIG. 5, the first frame 500 of a "Best Bakeries in Boston" graphic is retargeted onto a target video take without gestural fine-tuning. The actor is just about to raise their hands to wave, but the graphic 502 has already appeared. Frame 504 shows the same graphic having been retargeted with gestural fine-tuning. The actor has raised their hands 506 to wave, and the graphic 508 appears in coordination with the gesture. The difference between the two appearance times in this example was ~200 ms. The gestural fine tuning helps the asset better align with the performance in this case. This fine-tuning contributes to a "snappy" effect where the appearance of an asset looks coordinated with a gesture.

Figure 6:
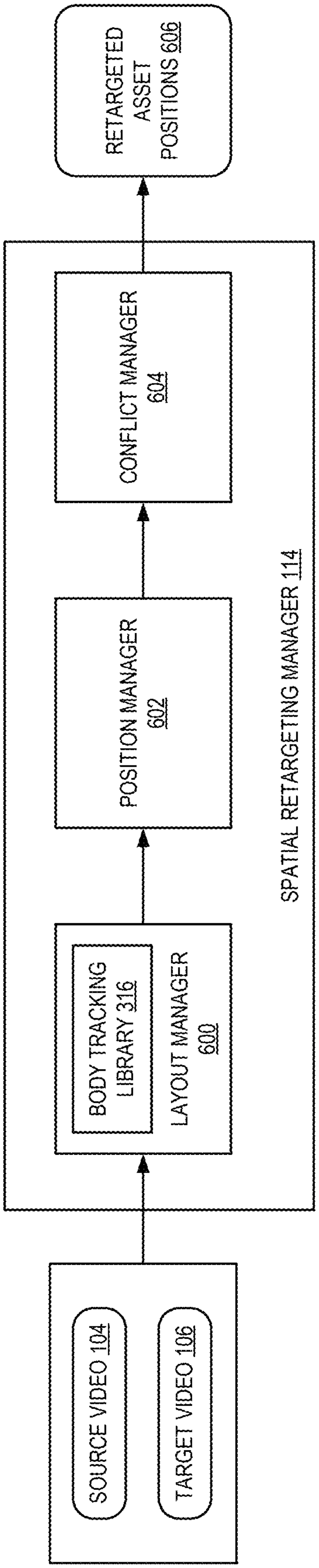
FIG. 6 illustrates a diagram of a spatial retargeting manager in accordance with one or more embodiments.

FIG. 6 illustrates a diagram of a spatial retargeting manager in accordance with one or more embodiments. Unlike temporal alignment where placement of assets is easier to describe and detect, evaluating good spatial alignment is more challenging. There can be many potential compositions or ways to lay out the assets that are equally acceptable when resolving positioning conflicts. One motivation for spatial retargeting is to avoid assets overlapping the performers' face and/or torso, which may have moved between the two videos (e.g., when retargeting to a new video with the same aspect ratio). Therefore, embodiments compute the percentage occlusion of the face and torso as an evaluation metric. Retargeting may also be performed to change aspect ratios (e.g., from a horizontal target video to a vertical target video, or other aspect ratio change). Because the constraints on composition are drastically different between different aspect ratios, the motivations of spatial retargeting for these videos may be slightly different. For example, the motivations for spatial retargeting may include ensuring that the graphics all fit within the new frame, then that the graphics do not overlap each other or the performer(s), and finally that the graphics are arranged in a visually appealing manner. The challenges associated with such retargeting are discussed further below.

Spatial retargeting is necessary when the underlying visual content of the video changes, namely when regions of interest move and avoiding occlusion is desired. The spatial retargeting manager 114 can compute new positions $(x_a, y_a)$ of the assets $a \in A$. In some embodiments, a layout manager 600 can identify regions of interest depicted in each frame. For example, some regions of interest are used as the bounding boxes of the face and torso identified using the body tracking library 316. Nevertheless, many other dynamic bounding boxes may work as an ROI. A position manager 602 can then implement geometric rules to position the assets. In some embodiments, each asset $a \in A$ is considered individually. For each dynamic ROI R, its maximal bounding box BR is computed across all the frames a is on screen, i.e. from $t_a$ to $*t_a$. $B_l$ and $B_r$ denote the left and right x-axis coordinates, $B_t$ and $B_b$ denote the top and bottom y-axis coordinates, and $B_w$ and $B_h$ denote the width and height of the box. Similarly the bounding box is computed of each asset to get a $B^a \forall a \in A$ without the maximal property. To clarify, the system also supports static assets that do not move or change size (unlike the dynamic ROIs which do).

Heuristic rules can be used to reposition invalid assets. An asset a requires repositioning if it intersects any ROI, that is to say $B^A \cap B^R \neq \emptyset$fflR, or if part of it is off-screen. For example, if an asset intersects with the head or torso of the main person in a video, it needs to be repositioned. The following heuristic approach may be applied:

(1) If a requires repositioning, attempt mirroring it across the y-axis while preserving its ratio of distance to screen-edge over distance to torso-edge.
(2) If a still requires repositioning, attempt aligning it to the left and right edges of the screen with padding.
(3) If a still requires repositioning, center it and . . .
(a) . . . if a is text insert line breaks to achieve lines with similar length.
(b) . . . otherwise scale it to the corresponding width or height of the target video.
(4) If a lies near the head, attempt to move it down if there is space.
(5) If a still lies near the head, attempt to move it to the side if there is space.

This method generalizes well to video compositions when only one asset is on the screen at the time. It is a procedural so operations can be defined that obey common visual layout goals, such as giving both ROIs and assets enough "space" around them. However, the procedure would grow exponentially complex with an arbitrary number of assets that try to follow the geometric rules—while not overlapping each other if they were not overlapping in the first place.

Therefore, this process can be performed independently for each asset a with output target positions $$(x'_a, y'_a).$$

This can, however, result in positioning conflicts between assets. Conflict manager 604 can apply integer programming to resolve positioning conflicts. Linear programming, integer programming, and other constraint-based programming methods have long been used for auto-layout procedures that seek to find an optimal arrangement for some set of input assets, typically in UI layout and packing problems. Drawing upon this line of work, embodiments define a mixed integer linear program (MILP) to create a final conflict-free layout within the context of retargeting that respects the geometric rule output (e.g., a prior) as close as possible. MILPs are declarative so they can guarantee properties such as non-overlap while maximizing for some other objective such as similarity to the geometric rule output.

For the decision variables, the conflict manager 604 is first optimizing the $x_a$, $y_a$ position of each asset with dimensions $w_a \times h_a$ and target video dimensions $\mathbb{W} \times \mathbb{H}$.. To avoid overlapping between a pair of rectangular bounding boxes for assets $a_i$ and $a_j$, there exists either one line that partitions along the x-axis or y-axis or two lines that partition along both axes. Embodiments introduce binary decision variables $\Pi_{ij} \in 0, 1$ to reflect that $a_i$ is completely to the left of $a_j$ with padding p through the following constraints:

$$\prod_{ij} + \prod_{ji} \le 1$$

$$x_j \ge p + x_i + w_i + \mathbb{W} \cdot \left(\prod_{ij} - 1\right)$$

$$x_i \ge p + x_j + w_j + \mathbb{W} \cdot \left(\prod_{ji} - 1\right)$$

Embodiments similarly define two decision variables $\Gamma_{ij} \in 0, 1$ to reflect that $a_i$ is completely above of $a_j$ with padding p through the following constraints:

$$\Gamma_j^i + \Gamma_i^j \le 1$$

-continued $$y_j \ge p + y_i + h_i + \mathbb{H} \cdot \left(\Gamma_i^j - 1\right)$$

$$y_i \ge p + y_j + h_j + \mathbb{H} \cdot \left(\Gamma_j^i - 1\right)$$

This guarantees only one asset can be to the left of the other (since $\Pi_{ij}$ and $\Pi_{ji}$ cannot both be 1) and only one asset can be above the other (since $$\Gamma_j^i$$

and $$\Gamma_i^j$$

cannot both be 1 either). However, at least one partition always exists so the binary decision variables must be lower-bounded by 1, resulting in $$1 \le \prod_{ij} + \prod_{ji} + \Gamma_j^i + \Gamma_i^j \le 2.$$

For every pair of assets $a_i$ and ROI R that must not overlap, these constraints are added. For every pair of assets $a_i$, $a_j$ that also must not overlap, these constraints and decision variables are added to the MILP; therefore the size of the program grows in $O(n_2)$. In some embodiments, each $x_a$, $y_a$ minimizes the distance to the geometric rule output $$(x'_a, y'_a),$$

e.g., it minimizes $$|x_a - x'_a| + |y_a - y'_a|.$$

These non-linear cost terms can be converted into linear constraints by bounding with auxiliary variables $$t_x^a$$

and $$t_y^a$$

such that:

$$\min|x_a - x'_a| +$$

-continued $$|y_a - y'_a| \Longrightarrow \begin{array}{c} \min\ t_x^a + t_y^a \\ \text{subject to } |x_a - x'_a| \le t_x^a \\ |y_a - y'_a| \le t_y^a \end{array} \Longrightarrow \begin{array}{c} \min\ t_x^a + t_y^a \\ \text{subject to } x_a - x'_a \le t_x^a \\ -x_a + x'_a \le t_x^a \\ y_a - y'_a \le t_y^a \\ -y_a + y'_a \le t_y^a \end{array}$$

These auxiliary variables have coefficient 1 in the cost term to balance their influence equally. Finally, constraints are added to prevent assets from going off-screen for each asset a and similarly add padding around the border. So $p < x_a \le \mathbb{W} - w_a - p$ and $p \le y_a \le \mathbb{H} - h_a - p$.

The benefit of MILPs for optimization is the separation of satisfying constraints and minimizing cost terms. This, however, comes at the cost of introducing the scenario where problems are infeasible to solve—where there is no spatial rearrangement that satisfies the constraints. In the case that the setup is infeasible, the conflict manager 604 iteratively removes constraints associated with different ROIs to "relax" the problem and resolve until feasibility is achieved. In some embodiments, the relaxation schedule for a video with a person is to remove constraints of overlapping with the torso first, overlapping with the face second, and then overlapping with other assets and the screen. In some embodiments, an open-source library, such as the open-source HIGHS library, can be used to solve the final MILPs.

Figure 7:
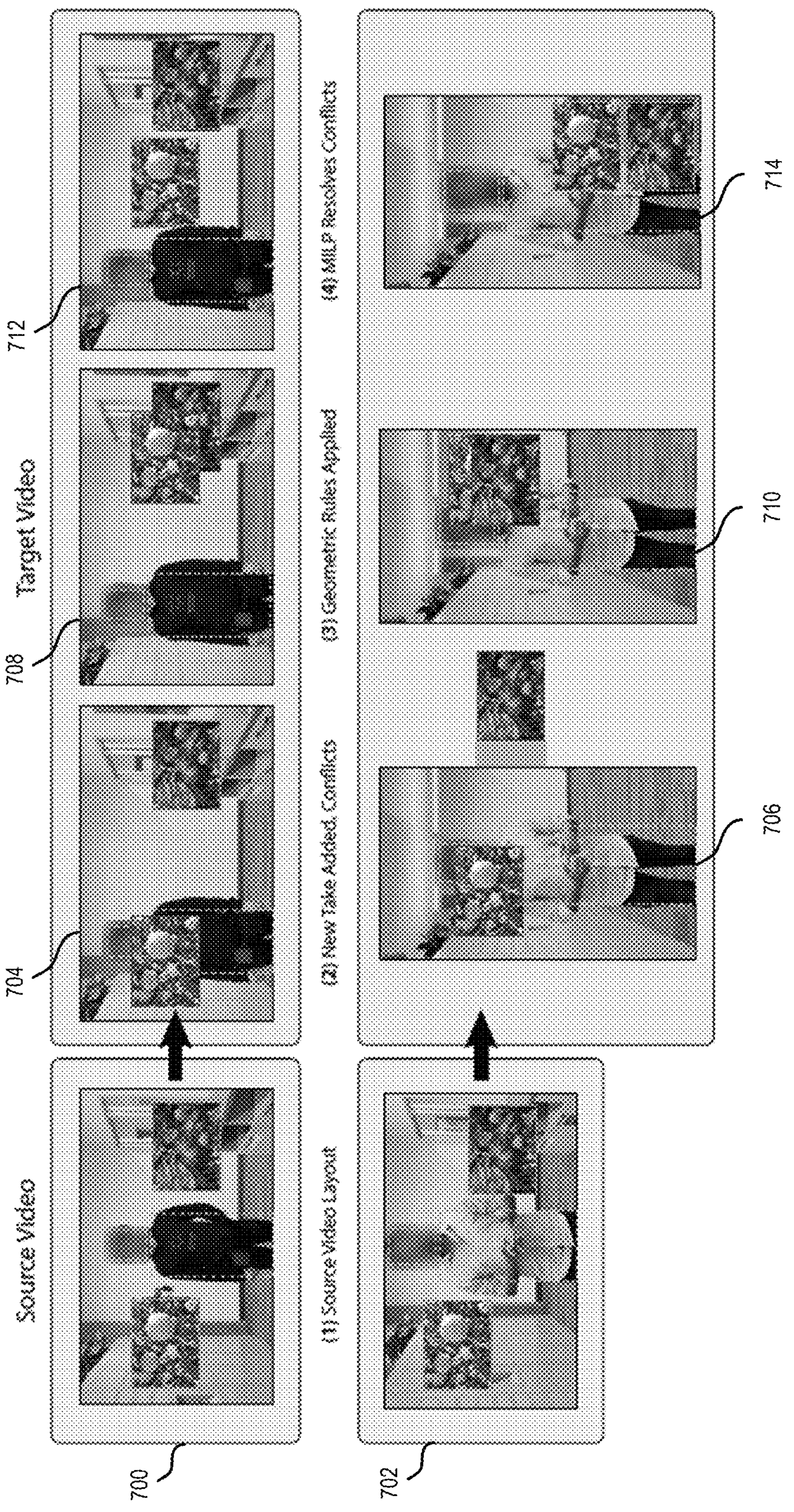
FIG. 7 illustrates an example of spatial alignment in accordance with one or more embodiments.

FIG. 7 illustrates examples of spatial retargeting in accordance with one or more embodiments. As discussed, spatial retargeting can be performed in four stages. This process is shown in FIG. 7 for two different videos. Source video 700 is spatially retargeted in a landscape orientation, and source video 702 is spatially retargeted in a portrait orientation. In the first step, embodiments start with the layout created by the user in the original source video. This can include identifying bounding boxes corresponding to the speaker's head and torse. As shown in the second step, the source layout can then be applied to the target video at the retargeted time(s) determined by the temporal retargeting manager. As shown in frames 704 and 706, directly transferring the layout to the new videos causes unwanted overlaps and, in frame 706, off-screen clipping when the aspect ratio changes.

As discussed, these overlaps can be addressed using geometric rules. For example, the geometric rules can include mirroring the layout along the torso, preserving margin ratios, bounding to the screen, etc. As shown in frames 708 and 710, this fixes the many of the issues but not all of the overlaps. Accordingly, in the fourth step, a mixed-integer linear program (MILP) can be solved to resolve these overlap conflicts. As shown in frame 712, solving the MILP has resolved the overlaps, with neither asset overlapping the ROIs or each other. As shown in frame 714, there is no spatial rearrangement that satisfies the constraints. As such, the constraints can be relaxed until a spatial arrangement satisfies the relaxed constraints. In this example, the assets are no longer overlapping with each other but are allowed to overlap the speaker's torso.

Figure 8:
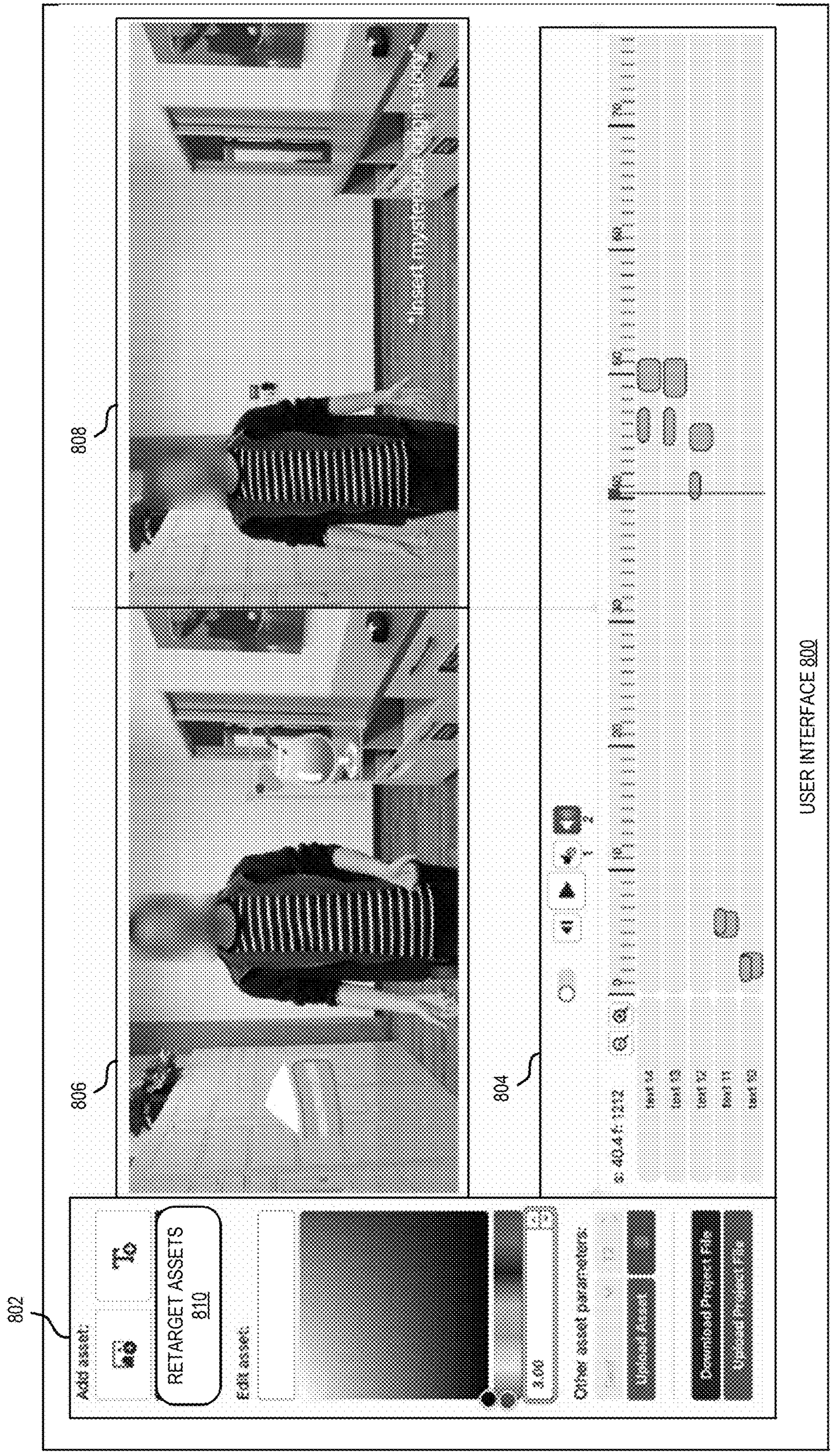
FIG. 8 illustrates an example of a video composition retargeting user interface in accordance with one or more embodiments.

FIG. 8 illustrates an example of a video composition retargeting user interface in accordance with one or more embodiments. User interface 800 can be implemented for video production system 100 or as a part of any video editing application. As shown in FIG. 8, in some embodiments, the user interface 800 includes a panel 802 which enables the user to upload a source video. In some embodiments, panel 802 can also enable the user to import graphics to be added to the source video, as discussed. The source video and/or assets may be stored locally, remotely over a local network, the Internet, or other network. The user may select the source video and/or assets via a file system, by providing a link to the source video and/or assets, etc.

The user can then use timeline panel 804 to temporally align the graphics and the source video panel 806 to position the graphics within the frame. The user interface 800 also enables the user to import a second video via panel 802. The second video can be the target video to which the graphics will be retargeted. As shown in FIG. 8, the second video can be added to the target video panel 808. The user can then select the retarget assets icon 810 which causes the video production system to perform the techniques described herein and apply the graphics from the source video to the target video at the appropriate locations and times. As discussed, this saves the editor from having to manually realign the assets in the right video, as they would typically have to do in a standard video editing tool.

Figure 9:
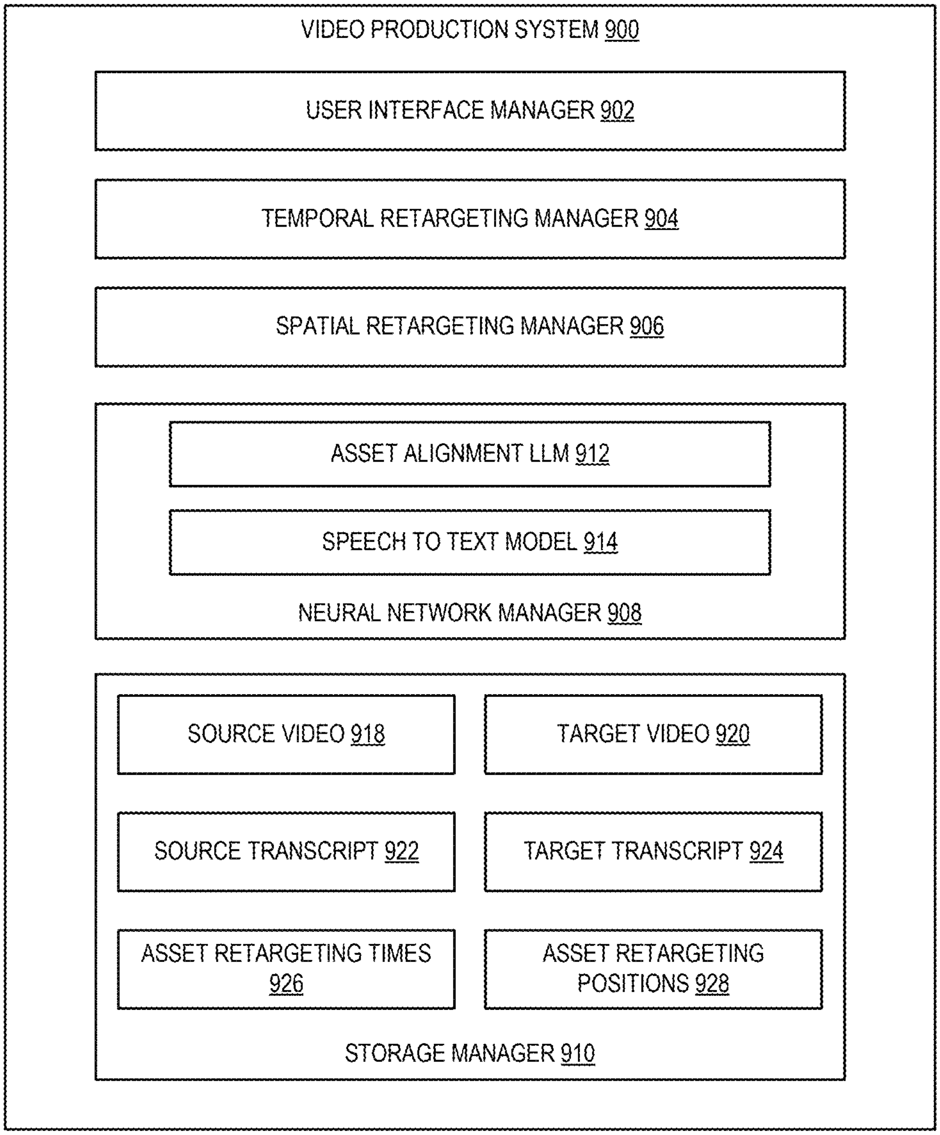
FIG. 9 illustrates a schematic diagram of a video production system in accordance with one or more embodiments.

FIG. 9 illustrates a schematic diagram of video production system (e.g., "video production system" described above) in accordance with one or more embodiments. As shown, the video production system 900 may include, but is not limited to, user interface manager 902, temporal retargeting manager 904, spatial retargeting manager 906, neural network manager 908, and storage manager 910. The neural network manager 908 includes asset alignment LLM 912 and speech to text model 914. The storage manager 910 includes source video 918, target video 920, source transcript 922, target transcript 924, asset retargeting times 926, and asset retargeting positions 928.

As illustrated in FIG. 9, the video production system 900 includes a user interface manager 902. For example, the user interface manager 902 allows users to provide source video 918 and target video 920 to the video production system 900. In some embodiments, the user interface manager 902 provides a user interface through which the user can upload the source and target videos, assets, etc., as discussed above. Alternatively, or additionally, the user interface may enable the user to download the videos from a local or remote storage location (e.g., by providing an address (e.g., a URL or other endpoint) associated with an image source). In some embodiments, the user interface can enable a user to link an image capture device, such as a camera or other hardware to capture the source and target video data and provide it to the video production system 900.

Additionally, the user interface manager 902 allows users to request the video production system 900 to edit the source video such as by adding graphics or other overlays to the source video 918. In some embodiments, the user interface manager 902 also enables the user to request that the assets applied to the source video be automatically retargeted to the target video.

As illustrated in FIG. 9, the video production system 900 includes a temporal retargeting manager 904. The temporal retargeting manager 904. Temporal retargeting manager 904 can identify events associated with the source video along with corresponding context information in the source transcript and timestamp data. As discussed, the events may include when an asset appears in the source data. The output of the temporal retargeting manager 904 is a set of asset retargeted times 926 which indicate when in the target video the assets should appear. As discussed, the temporal retargeting manager can determine these times using transcript alignment. Transcript alignment can include finding a keyword and encompassing phrases/sentences (e.g., context) that correspond to assets appearing in the source video and then determining corresponding keywords and context in the target transcript. By using an asset alignment LLM, the corresponding keywords and context do not have to be identical to that in the source transcript, instead semantically similar keywords and context can be identified in the target transcript as matching the keywords and context of the source transcript. This enables videos with significant rephrasing, ordering, etc. of content to be matched to similar content in the source video. The temporal retargeting manager 904 outputs a set of retargeted times for the set of assets to retarget those assets in the target video. In some embodiments, the retargeting times can be further refined based on gesture information extracted from the source and/or target videos using a body tracking library, as discussed.

As illustrated in FIG. 9, the video production system 900 includes a spatial retargeting manager 906. The spatial retargeting manager 906. Spatial retargeting manager 906 can use the retargeting times to determine whether the asset positions need to be updated. For example, the retargeted times can be used to add the assets to the target video. The spatial retargeting manager 906 can implement heuristic-based rules to reposition assets by comparing bounding boxes associated with the assets to regions of interest (e.g., the speaker's head and torso, the boundaries of the frame, etc.), as discussed. Integer programming can then be used to resolve position conflicts and determine a layout that satisfies the heuristic rules. The final satisfying layout yields the asset positions, which is the output of the spatial retargeting manager 906. The video production system can then automatically update the target video using the asset retargeting times and the asset retargeting positions, as discussed.

As illustrated in FIG. 9, the video production system 900 also includes a neural network manager 908. Neural network manager 908 may host a plurality of neural networks or other machine learning models, such as asset alignment LLM 912 and speech to text model 914. The neural network manager 908 may include an execution environment, libraries, and/or any other data needed to execute the machine learning models. In some embodiments, the neural network manager 908 may be associated with dedicated software and/or hardware resources to execute the machine learning models. In various embodiments, each network hosted by neural network manager 908 may be the same type of network or may be different types of networks, depending on implementation. Although depicted in FIG. 9 as being hosted by a single neural network manager 908, in various embodiments the neural networks may be hosted by multiple neural network managers and/or as part of different components. For example, each network can be hosted by its own neural network manager, or other host environment, in which the respective neural networks execute, or the networks may be spread across multiple neural network managers depending on, e.g., the resource requirements of each network, etc.

As illustrated in FIG. 9, the video production system 900 also includes the storage manager 910. The storage manager 910 maintains data for the video production system 900. The storage manager 910 can maintain data of any type, size, or kind as necessary to perform the functions of the video production system 900. The storage manager 910, as shown in FIG. 9, includes the source video 918. The source video 918 can include one or more digital video files, as discussed in additional detail above. Similarly, the storage manager 910 can also include target video 920. The target video may also include one or more digital files as discussed. Additionally, the source video 918 and target video 920 may include depictions of performances of similar content (e.g., the source and target videos may represent multiple takes of the same scene, etc.).

As further illustrated in FIG. 9, the storage manager 910 also includes source transcript 922 and target transcript 924. Source transcript 922 and target transcript 924 can include text data extracted from the source and target videos using speech to text model 914 or other automated speech recognition techniques. The storage manager 910 may also include asset retargeting times 926 and asset retargeting positions 928. As discussed, the temporal retargeting manager 904 generates asset retargeting times 926 based on the transcripts and, optionally, gesture information from the source and target videos. The asset retargeting times include timestamp data for each asset corresponding to when in the target video the asset should appear. Similarly, the spatial retargeting manager 906 generates the asset retargeting positions 928. The asset retargeting positions 928 are positions in the frames of the target video where the assets should appear at the retargeted times.

Each of the components 902-910 of the video production system 900 and their corresponding elements (as shown in FIG. 9) may be in communication with one another using any suitable communication technologies. It will be recognized that although components 902-910 and their corresponding elements are shown to be separate in FIG. 9, any of components 902-910 and their corresponding elements may be combined into fewer components, such as into a single facility or module, divided into more components, or configured into different components as may serve a particular embodiment.

The components 902-910 and their corresponding elements can comprise software, hardware, or both. For example, the components 902-910 and their corresponding elements can comprise one or more instructions stored on a computer-readable storage medium and executable by processors of one or more computing devices. When executed by the one or more processors, the computer-executable instructions of the video production system 900 can cause a client device and/or a server device to perform the methods described herein. Alternatively, the components 902-910 and their corresponding elements can comprise hardware, such as a special purpose processing device to perform a certain function or group of functions. Additionally, the components 902-910 and their corresponding elements can comprise a combination of computer-executable instructions and hardware.

Furthermore, the components 902-910 of the video production system 900 may, for example, be implemented as one or more stand-alone applications, as one or more modules of an application, as one or more plug-ins, as one or more library functions or functions that may be called by other applications, and/or as a cloud-computing model. Thus, the components 902-910 of the video production system 900 may be implemented as a stand-alone application, such as a desktop or mobile application. Furthermore, the components 902-910 of the video production system 900 may be implemented as one or more web-based applications hosted on a remote server. Alternatively, or additionally, the components of the video production system 900 may be implemented in a suite of mobile device applications or "apps."

As shown, the video production system 900 can be implemented as a single system. In other embodiments, the video production system 900 can be implemented in whole, or in part, across multiple systems. For example, one or more functions of the video production system 900 can be performed by one or more servers, and one or more functions of the video production system 900 can be performed by one or more client devices. The one or more servers and/or one or more client devices may generate, store, receive, and transmit any type of data used by the video production system 900, as described herein.

In one implementation, the one or more client devices can include or implement at least a portion of the video production system 900. In other implementations, the one or more servers can include or implement at least a portion of the video production system 900. For instance, the video production system 900 can include an application running on the one or more servers or a portion of the video production system 900 can be downloaded from the one or more servers. Additionally or alternatively, the video production system 900 can include a web hosting application that allows the client device(s) to interact with content hosted at the one or more server(s).

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 11. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 11.

The server(s) may include one or more hardware servers (e.g., hosts), each with its own computing resources (e.g., processors, memory, disk space, networking bandwidth, etc.) which may be securely divided between multiple customers (e.g. client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 11.

Figure 10:
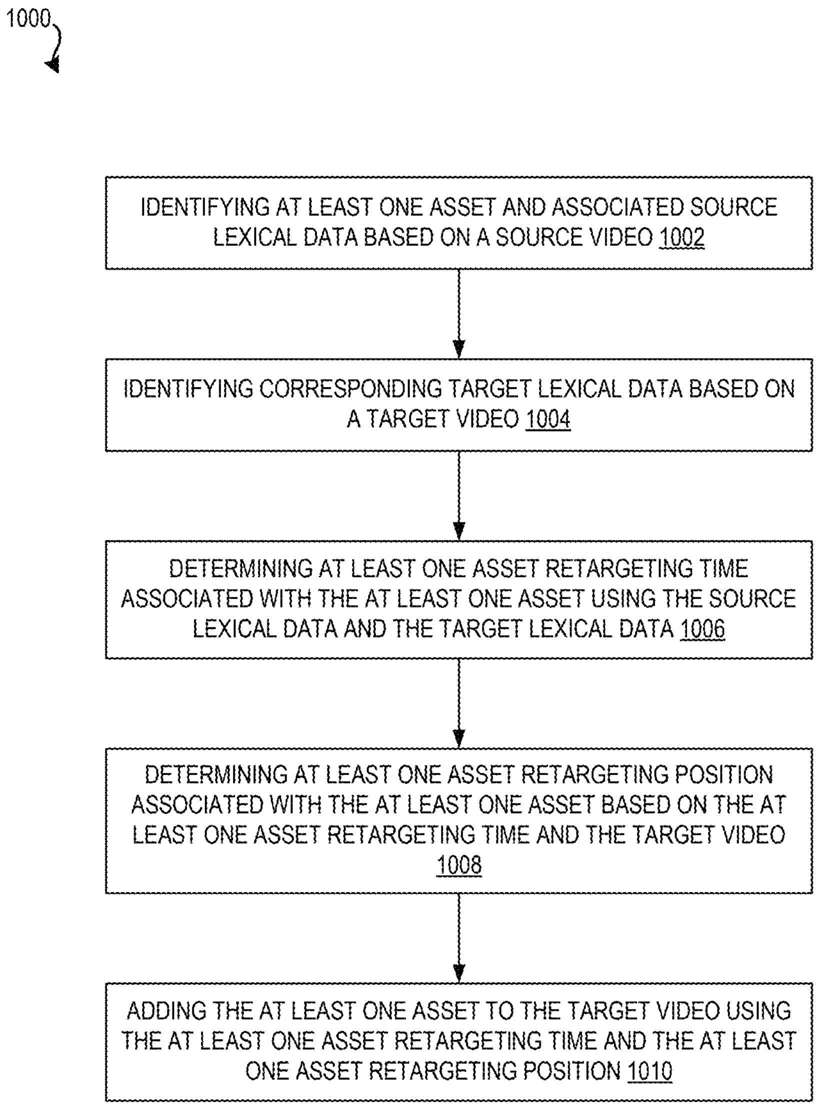
FIG. 10 illustrates a flowchart of a series of acts in a method of video composition retargeting in accordance with one or more embodiments.

FIGS. 1-9, the corresponding text, and the examples, provide a number of different systems and devices that enable video composition retargeting. In addition to the foregoing, embodiments can also be described in terms of flowcharts comprising acts and steps in a method for accomplishing a particular result. For example, FIG. 10 illustrates a flowchart of an exemplary method in accordance with one or more embodiments. The method described in relation to FIG. 10 may be performed with fewer or more steps/acts or the steps/acts may be performed in differing orders. Additionally, the steps/acts described herein may be repeated or performed in parallel with one another or in parallel with different instances of the same or similar steps/acts.

FIG. 10 illustrates a flowchart 1000 of a series of acts in a method of video composition retargeting in accordance with one or more embodiments. In one or more embodiments, the method 1000 is performed in a digital medium environment that includes the video production system 900. The method 1000 is intended to be illustrative of one or more methods in accordance with the present disclosure and is not intended to limit potential embodiments. Alternative embodiments can include additional, fewer, or different steps than those articulated in FIG. 10.

As illustrated in FIG. 10, the method 1000 includes an act 1002 of identifying at least one asset and associated source lexical data based on a source video. In some embodiments, automated speech recognition can be used to generate a source transcript based on the source video and a target transcript based on the target video.

As illustrated in FIG. 10, the method 1000 includes an act 1004 of identifying corresponding target lexical data based on a target video. The source lexical data includes a keyword and encompassing phrase from the source transcript and wherein the target lexical data includes a keyword and encompassing phrase from the target transcript. In some embodiments, identifying corresponding target lexical data based on a target video, further includes identifying the target lexical data as being at least semantically similar to the source lexical data using an asset alignment large language model (LLM).

As illustrated in FIG. 10, the method 1000 includes an act 1006 of determining at least one asset retargeting time associated with the at least one asset using the source lexical data and the target lexical data. In some embodiments, determining at least one asset retargeting time associated with the at least one asset using the source lexical data and the target lexical data, further includes fine-tuning the at least one asset retargeting time based on speaker motion depicted in the target video, wherein the speaker motion is identified using a body tracking library.

As illustrated in FIG. 10, the method 1000 includes an act 1008 of determining at least one asset retargeting position associated with the at least one asset based on the at least one asset retargeting time and the target video. In some embodiments, determining at least one asset retargeting position associated with the at least one asset based on the at least one asset retargeting time and the target video, further includes identifying regions of interest in the target video using a body tracking library, wherein the regions of interest correspond to portions of a speaker and identifying at least one bounding box associated with the at least one asset. In some embodiments, the at least one asset is placed at a same position in the target video as in the source video at the at least one asset retargeting time. An overlap between the at least one asset in the target video and a region of interest in the target video can then be determined. Heuristic rules can be applied to the at least one asset to determine the at least one asset retargeting position.

In some embodiments, the heuristic rules define position constraints to be applied sequentially. In some embodiments, a position conflict can be determined to exist between a first at least one asset and a second at least one asset in the target video. A layout can then be determined that resolves the position conflict between the first at least one asset and the second at least one asset using integer programming.

As illustrated in FIG. 10, the method 1000 includes an act 1010 of adding the at least one asset to the target video using the at least one asset retargeting time and the at least one asset retargeting position.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("saaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
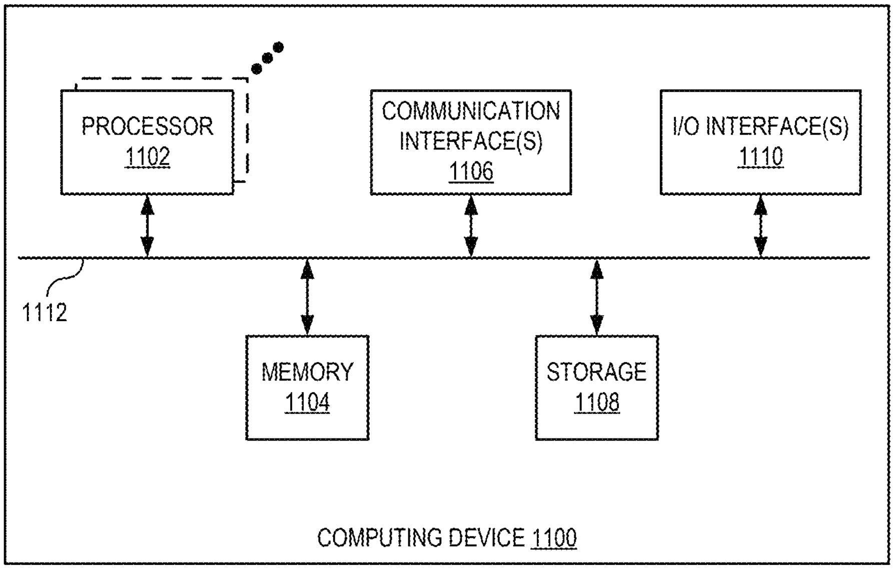
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that one or more computing devices such as the computing device 1100 may implement the video production system. As shown by FIG. 11, the computing device can comprise a processor 1102, memory 1104, one or more communication interfaces 1106, a storage device 1108, and one or more I/O devices/interfaces 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1108 and decode and execute them. In various embodiments, the processor(s) 1102 may include one or more central processing units (CPUs), graphics processing units (GPUs), field programmable gate arrays (FPGAs), systems on chip (SoC), or other processor(s) or combinations of processors.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 can further include one or more communication interfaces 1106. A communication interface 1106 can include hardware, software, or both. The communication interface 1106 can provide one or more interfaces for communication (such as, for example, packet-based communication) between the computing device and one or more other computing devices 1100 or one or more networks. As an example and not by way of limitation, communication interface 1106 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

The computing device 1100 includes a storage device 1108 includes storage for storing data or instructions. As an example, and not by way of limitation, storage device 1108 can comprise a non-transitory storage medium described above. The storage device 1108 may include a hard disk drive (HDD), flash memory, a Universal Serial Bus (USB) drive or a combination these or other storage devices. The computing device 1100 also includes one or more input or output ("I/O") devices/interfaces 1110, which are provided to allow a user to provide input to (such as user strokes), receive output from, and otherwise transfer data to and from the computing device 1100. These I/O devices/interfaces 1110 may include a mouse, keypad or a keyboard, a touch screen, camera, optical scanner, network interface, modem, other known I/O devices or a combination of such I/O devices/interfaces 1110. The touch screen may be activated with a stylus or a finger.

The I/O devices/interfaces 1110 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1110 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:

identifying at least one asset and associated source lexical data based on a source video;

identifying corresponding target lexical data based on a target video;

determining at least one asset retargeting time associated with the at least one asset using the source lexical data and the target lexical data;

determining at least one asset retargeting position associated with the at least one asset based on the at least one asset retargeting time and the target video; and adding the at least one asset to the target video using the at least one asset retargeting time and the at least one asset retargeting position.

2. The method of claim 1, further comprising:

using automated speech recognition to generate a source transcript based on the source video and a target transcript based on the target video.

3. The method of claim 2, wherein the source lexical data includes a keyword and encompassing phrase from the source transcript and wherein the target lexical data includes a keyword and encompassing phrase from the target transcript.

4. The method of claim 3, wherein identifying corresponding target lexical data based on a target video, further comprises:

identifying the target lexical data as being at least semantically similar to the source lexical data using an asset alignment large language model (LLM).

5. The method of claim 1, wherein determining at least one asset retargeting time associated with the at least one asset using the source lexical data and the target lexical data, further comprises:

fine-tuning the at least one asset retargeting time based on speaker motion depicted in the target video, wherein the speaker motion is identified using a body tracking library.

6. The method of claim 1, wherein determining at least one asset retargeting position associated with the at least one asset based on the at least one asset retargeting time and the target video, further comprises:

identifying regions of interest in the target video using a body tracking library, wherein the regions of interest correspond to portions of a speaker; and identifying at least one bounding box associated with the at least one asset.

7. The method of claim 6, further comprising:
- placing the at least one asset at a same position in the target video as in the source video at the at least one asset retargeting time;
- determining an overlap between the at least one asset in the target video and a region of interest in the target video; and
- applying heuristic rules to the at least one asset to determine the at least one asset retargeting position.

8. The method of claim 7, wherein the heuristic rules define position constraints to be applied sequentially.

9. The method of claim 7, further comprising:
- determining a position conflict exists between a first at least one asset and a second at least one asset in the target video; and
- determining a layout that resolves the position conflict between the first at least one asset and the second at least one asset using integer programming.

10. A non-transitory computer-readable medium storing executable instructions, which when executed by a processing device, cause the processing device to perform operations comprising:
- identifying at least one asset and associated source lexical data based on a source video;
- identifying corresponding target lexical data based on a target video;
- determining at least one asset retargeting time associated with the at least one asset using the source lexical data and the target lexical data;
- determining at least one asset retargeting position associated with the at least one asset based on the at least one asset retargeting time and the target video; and
- adding the at least one asset to the target video using the at least one asset retargeting time and the at least one asset retargeting position.

11. The non-transitory computer-readable medium of claim 10, storing instructions that further cause the processing device to perform operations comprising:
- using automated speech recognition to generate a source transcript based on the source video and a target transcript based on the target video.

12. The non-transitory computer-readable medium of claim 11, wherein the source lexical data includes a keyword and encompassing phrase from the source transcript and wherein the target lexical data includes a keyword and encompassing phrase from the target transcript.

13. The non-transitory computer-readable medium of claim 12, wherein the operation of identifying corresponding target lexical data based on a target video, further comprises:
- identifying the target lexical data as being at least semantically similar to the source lexical data using an asset alignment large language model (LLM).

14. The non-transitory computer-readable medium of claim 10, wherein the operation of determining at least one asset retargeting time associated with the at least one asset using the source lexical data and the target lexical data, further comprises:
- fine-tuning the at least one asset retargeting time based on speaker motion depicted in the target video, wherein the speaker motion is identified using a body tracking library.

15. The non-transitory computer-readable medium of claim 10, wherein the operation of determining at least one asset retargeting position associated with the at least one asset based on the at least one asset retargeting time and the target video, further comprises:
- identifying regions of interest in the target video using a body tracking library, wherein the regions of interest correspond to portions of a speaker; and
- identifying at least one bounding box associated with the at least one asset.

16. The non-transitory computer-readable medium of claim 15, storing instructions that further cause the processing device to perform operations comprising:
- placing the at least one asset at a same position in the target video as in the source video at the at least one asset retargeting time;
- determining an overlap between the at least one asset in the target video and a region of interest in the target video; and
- applying heuristic rules to the at least one asset to determine the at least one asset retargeting position.

17. The non-transitory computer-readable medium of claim 16, wherein the heuristic rules define position constraints to be applied sequentially.

18. The non-transitory computer-readable medium of claim 16, further comprising:
- determining a position conflict exists between a first at least one asset and a second at least one asset in the target video; and
- determining a layout that resolves the position conflict between the first at least one asset and the second at least one asset using integer programming.

19. A system comprising:
- a memory component; and
- a processing device coupled to the memory component, the processing device to perform operations comprising:
  - receiving a request to add at least one asset to a source video;
  - receiving a request to retarget the at least one asset from the source video to a target video;
  - determining at least one asset retargeting time by semantically matching source lexical data associated with the at least one asset to target lexical data using an asset alignment large language model; and
  - adding the at least one asset to the target video using the at least one asset retargeting time.

20. The system of claim 19, wherein the processing device performs further operations comprising:
- identifying regions of interest in the target video using a body tracking library, wherein the regions of interest correspond to portions of a speaker;
- identifying at least one bounding box associated with the at least one asset; and
- determining at least one asset retargeting position associated with the at least one asset based on the regions of interest in the target video and the at least one bounding box associated with the at least one asset using a mixed integer linear program (MILP).

* * * * *